United States Patent
Thorne (10) Patent No.: US 7,100,725 B2
(45) Date of Patent: Sep. 5, 2006

(54) ROBOTIC CART PULLING VEHICLE

(75) Inventor: Henry F. Thorne, Pittsburgh, PA (US)

(73) Assignee: Aethon, Pittsburgh, PA (US)

( * ) Notice: Subject to any disclaimer, the term of this patent is extended or adjusted under 35 U.S.C. 154(b) by 283 days.

(21) Appl. No.: 10/651,497

(22) Filed: Aug. 29, 2003

(65) Prior Publication Data

US 2005/0029029 A1    Feb. 10, 2005

Related U.S. Application Data

(60) Provisional application No. 60/407,117, filed on Aug. 30, 2002.

(51) Int. Cl.
*B60T 7/16*  (2006.01)

(52) U.S. Cl. .................................. 180/169; 180/6.5

(58) Field of Classification Search ............... 180/169, 180/6.5; 280/492, 422; 301/5.306, 5.307, 301/5.308; 152/323, 394
See application file for complete search history.

(56) References Cited

U.S. PATENT DOCUMENTS

| | | | |
|---|---|---|---|
| 4,483,407 A | | 11/1984 | Iwamoto et al. |
| 4,746,977 A | | 5/1988 | White |
| 4,800,977 A | | 1/1989 | Boegli et al. |
| 4,816,998 A | | 3/1989 | Ahlbom |
| 4,847,769 A | * | 7/1989 | Reeve ........................ 701/23 |
| 4,875,172 A | | 10/1989 | Kanayama |
| 4,944,357 A | * | 7/1990 | Wible et al. ............... 180/169 |
| 5,170,352 A | | 12/1992 | McTamaney et al. |
| 5,175,480 A | | 12/1992 | McKeefery et al. |
| 5,276,618 A | | 1/1994 | Everett, Jr. |
| 5,315,517 A | | 5/1994 | Kawase et al. |
| 5,324,948 A | | 6/1994 | Dudar et al. |
| 5,350,033 A | | 9/1994 | Kraft |
| 5,367,458 A | * | 11/1994 | Roberts et al. ................ 701/25 |
| 5,402,344 A | | 3/1995 | Reister et al. |
| 5,446,356 A | | 8/1995 | Kim |
| 5,461,292 A | | 10/1995 | Zondlo |
| 5,487,009 A | | 1/1996 | Hill |
| 5,488,277 A | | 1/1996 | Nishikawa et al. |
| 5,515,934 A | | 5/1996 | Davis |
| 5,535,843 A | * | 7/1996 | Takeda et al. ............... 180/200 |
| 5,545,960 A | | 8/1996 | Ishikawa |
| 5,548,511 A | | 8/1996 | Bancroft |
| 5,548,512 A | * | 8/1996 | Quraishi ....................... 701/23 |
| 5,559,696 A | | 9/1996 | Borenstein |
| 5,652,489 A | | 7/1997 | Kawakami |
| 5,680,306 A | | 10/1997 | Shin et al. |
| 5,684,696 A | | 11/1997 | Rao et al. |
| 5,687,294 A | | 11/1997 | Jeong |
| 5,709,007 A | | 1/1998 | Chiang |
| 5,739,657 A | | 4/1998 | Takayama et al. |
| 5,764,014 A | | 6/1998 | Jakeway et al. |
| 5,819,008 A | | 10/1998 | Asama et al. |

(Continued)

*Primary Examiner*—Christopher P. Ellis
*Assistant Examiner*—John Walters
(74) *Attorney, Agent, or Firm*—Reed Smith LLP (57) ABSTRACT

A robotic cart pulling vehicle includes a positioning error reducing system for reducing accumulated error in the ded-reckoning navigational system. The positioning error reducing system including at least one of a low load transfer point of the cart attaching mechanism, a floor variation compliance structure whereby the drive wheels maintain a substantially even distribution of load over minor surface variations, a minimal wheel contact surface structure, a calibration structure using at least one proximity sensor mounted on the robot body, and a common electrical and mechanical connection between the cart and the robot vehicle formed by a cart attaching post.

19 Claims, 7 Drawing Sheets

U.S. PATENT DOCUMENTS

| | | |
|---|---|---|
| 5,819,863 A | 10/1998 | Zollinger et al. |
| 5,867,800 A | 2/1999 | Leif |
| 5,908,466 A | 6/1999 | Veugen et al. |
| 5,916,285 A | 6/1999 | Alofs et al. |
| 5,942,869 A | 8/1999 | Katou et al. |
| 6,038,501 A * | 3/2000 | Kawakami .................... 701/23 |
| 6,041,274 A | 3/2000 | Onishi et al. |
| 6,046,565 A | 4/2000 | Thorne |
| 6,246,930 B1 * | 6/2001 | Hori .......................... 701/23 |
| 6,272,405 B1 | 8/2001 | Kubota |
| 6,308,118 B1 * | 10/2001 | Holmquist .................... 701/23 |
| 6,338,013 B1 | 1/2002 | Ruffner |
| 6,360,165 B1 | 3/2002 | Chowdhary |
| 6,370,453 B1 * | 4/2002 | Sommer ........................ 701/23 |
| 6,442,476 B1 | 8/2002 | Poropat |
| 6,445,983 B1 | 9/2002 | Dickson et al. |
| 6,446,005 B1 | 9/2002 | Bingeman et al. |
| 6,453,223 B1 | 9/2002 | Kelly et al. |
| 6,459,955 B1 | 10/2002 | Bartsch et al. |
| 6,459,966 B1 * | 10/2002 | Nakano et al. ................ 701/23 |
| 6,502,017 B1 | 12/2002 | Ruffner |
| 6,629,735 B1 * | 10/2003 | Galy ........................ 301/5.307 |
| 2004/0002283 A1 * | 1/2004 | Herbet et al. ................ 446/269 |
| 2004/0195012 A1 * | 10/2004 | Song et al. .................. 180/6.5 |

* cited by examiner

ROBOTIC CART PULLING VEHICLE

RELATED APPLICATIONS

This application claims the benefit of pending provisional application serial number 60/407,117 filed Aug. 30, 2002 entitled "Robotic Cart Pulling Vehicle" which is incorporated herein by reference in its entirety.

BACKGROUND OF THE INVENTION

1. Field of the Invention

The present invention relates to robotic cart pulling vehicles for automated hauling of materials indoors. More specifically, the present invention relates to a cart pulling deduced reckoning guided mobile robot system.

2. Background of the Invention

Robotic and automated vehicles for delivering or transporting material indoors have been developed and utilized in a number of applications. One well-known application is the automated mail delivery vehicles and robots. An example of such a mail delivery vehicle is manufactured by the Mailmobile division of Bell and Howell. Rather than being an independent robotic vehicle, this is an automatic guided vehicle following a prepared track, such as a painted ultraviolet track positioned on the floor. Another example is produced by FMC which manufactures an automated transport and logistics integration system, referred to as ATLIS, for moving specially designed carts in indoor environments, such as hospitals. To pick up a cart, the ATLIS vehicle positions itself under the cart, the deck of the vehicle is equipped with an electric lift which extends to raise the cart from the floor. The ATLIS system is generally a wire-guided system requiring a guide wire to be permanently installed in the floor.

In the hospital environment, a company referred to as Helpmate Robotics developed a robotic courier for hospitals. The robotic courier was essentially a wheeled cabinet. This hospital robotic courier is currently being offered by the Pyxis division of Cardinal Heath, Inc. The robotic courier has many disadvantages, the first of which is that it is overly expensive, and a second is that it is only useful for transporting materials that can fit in the associated cabinet installed with the robot.

A wide variety of prior art robotic and automated vehicles are discussed in the patent literature. For example, U.S. Pat. No. 4,746,977 to White is directed to a remotely operated steerable vehicle. U.S. Pat. No. 4,871,172 to Kanayama is directed toward a mobile robot and a control therefore. U.S. Pat. No. 5,488,277 to Nishikawa et al. discloses a collection of mobile robots and a control station for the plurality of mobile robots. U.S. Pat. No. 5,175,480 to McKeefery et al. is directed toward an automated guided vehicle. U.S. Pat. No. 5,461,292 Zondlo discloses a remote controlled two-wheeled lawn mowing vehicle. U.S. Pat. No. 5,545,960 to Ishikawa is directed toward a mobile machine following a predetermined path. U.S. Pat. No. 5,819,863 to Zollinger et al. is directed toward a robotic vehicle including a support structure. U.S. Pat. No. 5,709,007 to Chiang discloses a remote control vacuum having a remote control drive unit or cart to which a portable vacuum unit is removable attached.

Further the patent literature discussed a wide variety of navigational, error control, and obstacle detection systems such as discussed in the following patents that are incorporated herein by reference.

U.S. Pat. No. 5,276,618 to Everett, Jr. is directed toward a doorway transit navigational referencing system for a robot vehicle. This system utilizes a plurality of sensors for sensing known reference objects to obtain orientation information.

U.S. Pat. No. 5,324,948 to Dudar et al. discloses a robot following a predetermined path and uses the collection of a series of distinct data points between the sensor and a wall in order to recognize the object as a wall. Additionally, the patent discloses that if a door or other wall feature is found, the robot will ignore the new data points and use ded-reckoning until a valid "wall" is found.

U.S. Pat. No. 5,402,344 to Reister et al. is directed toward a method for independently controlling steerable drive wheels of the vehicle with two or more such wheels. The system provides a method for determining the wheel slip associated with a given wheel.

U.S. Pat. No. 5,548,511 to Bancroft discloses a robotic cleaning apparatus in which the robot measures and records the distances to the left and right boundaries as it travels to determine or map the area. Subsequent to mapping the area, it will determine the path for cleaning the area with the robot following a predetermined path in such cleaning. The Bancroft patent does disclose that encoders provide ded-reckoning navigation while the sensors provide corrections to errors caused by, for example, slippage of the wheels. The precise correction method utilized is not discussed. Additionally disclosed is that the sensors can be advantageously used to follow variations in the boundary of the area that deviate from dimensions measured in the learning phase and to avoid obstacles in the area. The Bancroft patent additionally discusses dealing with areas or variations by using the mode of the measurements obtained by the sensors, that is the value of the measurement that occurs most often. Additionally, the robot ignores measurements that are greater than a maximum range of the sensor.

U.S. Pat. No. 5,556,356 to Kim discloses a mobile robot incorporating a position correcting system. Included in the system is a distance detecting mechanism or sensor detecting the distance of separation between the robot and a separate positioning correcting mechanism positioned within a wall. The position correcting mechanism in the wall can include an infrared receiving unit and a transmitting unit which is selectively activated by the robot as is passes to send appropriate control compensating signals to the robot.

U.S. Pat. No. 5,559,696 to Borenstein discloses a mobile robot with an internal positioning error correction system utilized for correcting non-systematic deduced reckoning errors and discloses a robot with a trailer hitch connected to the center of the robot.

U.S. Pat. No. 5,652,489 to Kawakami is directed toward a mobile robot control system wherein the robots move on a predetermined route in a given area including optical detection sensors.

U.S. Pat. No. 5,680,306 to Shin et al. discloses a robotic vehicle primarily utilizing global positioning systems (GPS). The patent additionally discloses the use of deduced reckoning to supplement the GPS system.

U.S. Pat. No. 5,684,696 to Rao et al. discloses a system and method for enabling an autonomous vehicle to follow a desired path. The system utilizes a combination of a GPS and an initial reference unit (IRU) integrated together.

U.S. Pat. No. 5,687,294 to Jeong is directed toward a control system for a mobile robot including obstacle detection and correction of positioning and directional errors.

U.S. Pat. No. 5,739,657 to Takayama et al. is directed toward a control system for controlling the motion of an omni-directional robotic vehicle.

U.S. Pat. No. 5,819,008 to Asama et al. is directed toward a mobile robot sensor system for a system of multiple robots in a given environment. The robots utilize infrared sensors for communicating with other robots for avoiding other roots in the environment.

U.S. Pat. No. 5,942,869 to Katou et al. discloses an automated robotic vehicle utilizing caterpillar treads. Additionally disclosed is the use of supersonic or ultrasonic sensors for obstacle detection.

U.S. Pat. No. 6,041,274 to Onishi et al. is directed toward a positional deviation detecting device for a robot or working machine which utilizes a pick-up sensor for detecting the image on a floor.

The above discussed prior art does not effectively provide for a cart pulling or cart pulling robotic vehicle that would be useful for hauling materials on a variety of carts or wagons indoors. A cart pulling ded-reckoning guided robotic vehicle is disclosed in U.S. Pat. No. 6,046,565 (hereinafter "the '565 patent") that is also incorporated herein by reference. The '565 patent discloses a robotic vehicle with a deduced reckoning positioning system having a center mounted harness, or attachment mechanism, on the robot body for coupling a cart or wagon to be pulled thereby. The '565 patent teaches that the system calibrates the absolute position of the robotic vehicle relative to a fixed reference marker, such as a wall, to eliminate the accumulated error in the calculated position of the robotic vehicle. Additionally, the '565 patent discloses that a single reference wall may be used to eliminate the error in selected two parameters. With regard to the attachment mechanism or harness, the '565 patent suggests that the ratio of the height of the harness joint above the floor to the axle width should be as low as possible to better approximate the ideal planar situation. The '565 patent does not discuss the attachment mechanism further.

All of the above-discussed prior art has substantial disadvantages. It is the object of the present invention to improve upon the prior art and provide a cart or wagon pulling deduced reckoning guide mobile robot system useful for industrial applications, such as in hospitals and like. In this regard, the present application can be considered an improvement over some of the fundamental concepts disclosed in the '565 patent.

SUMMARY OF THE INVENTION

The objects of the present invention are achieved with a robotic cart pulling vehicle including a positioning error reducing system for reducing accumulated error in the ded-reckoning navigational system according to the present invention. The positioning error reducing system includes at least one of a low load transfer point of the cart attaching mechanism, a floor variation compliance structure whereby the drive wheels maintain a substantially even distribution of load over minor surface variations, a minimal wheel contact surface structure, a calibration structure using at least one proximity sensor mounted on the robot body, and an electrical and mechanical connection between the cart and the robotic vehicle formed with a cart attaching post Several of the improvements of the current invention forming the positioning error reducing system relate to the connection between the robot and the cart being pulled. Specifically, the mechanical connection between the cart and robot body is provided with a low force transfer point for reducing the deduced reckoning error. The force transfer point is preferably as low as possible, at least below the wheel axle. Mathematical descriptions for the low attachment location is having a height to base ratio of less than 1/5, or even less than 1/10, wherein height is the height of the attachment point above the surface defined by the bottom of the driven wheels and the base is the distance between the driven wheels along the wheel axle. A second improvement in the mechanical connection is the provision of a freedom of motion about the travel axle, also referred to as a floor variation compliance structure. A compliance of about 3 degrees or so between the robot and the cart attaching post allows one wheel to be vertically moved a certain distance while still maintaining an even distribution of force between the wheels. This allows the robot to compensate for uneven floors, doorjambs and other features without adversely affecting the deduced reckoning position control. A further feature of the mechanical connection is the use of the cart attaching post as both the mechanical connection as an electrical connection point between the robotic vehicle and the wagon or cart being pulled. The electrical connection allows information to pass back and forth between the processors in each device as well as allowing power to pass back and forth between either device. This will allow the battery for driving the robot to be located in the cart as opposed to in the robot body. The mechanical connection, finally, may include some compliance in the upper portion thereof, to assure that the mechanical transfer of force is at the lower portion for the reasons discussed above.

Another aspect of the positioning error reducing system for reducing accumulated error in the ded-reckoning navigational system according to the present invention is the calibration system for zeroing out deduced reckoning error using proximity sensors mounted on the vehicle body. The calibration system of the present invention places checkpoints along walls that have straight sections longer than a predetermined amount, such as two feet. The present system will place as many of these checkpoints as possible along any vertical structure meeting the minimum limitation requirement that is found in the robot's known world. In operation, when the robot is traveling parallel to a wall with a checkpoint, a conventional infrared proximity sensor is utilized to measure a series of distances to the wall. This generates a series of data points relative to the checkpoints and a statistical method is used to determine if the data meets the criteria for the wall. If this series of updated positions meets reasonable expectation, the data is utilized to update the robot position and, more importantly, the robot orientation.

A further modification in the robotic vehicle forming the positioning error reducing system for reducing accumulated error in the ded-reckoning navigational system is the wheel design for improved ded reckoning accuracy. The present wheel design is created to keep the variation in the wheel radius and the width between the wheels under 2%, or even 0.5%. The wheel design of the present invention is intended to minimize the contact patch width provided by the wheel as well as minimize the variation in the compression of the wheel relative to load on the vehicle. To accomplish this, the wheel is provided with a solid stiff circular core provided with an outer annular coating providing the tire tread. In cross-section, the tread may converge to an annular contact area of minimum width, other minimal width annular contact areas are also possible.

These and other advantages of the present invention will be clarified in the detailed description of the preferred embodiment taken together with the attached drawings.

BRIEF DESCRIPTION OF THE DRAWINGS

FIG. 10 is a top view of the harness connection shown in FIG. 8a; and

DESCRIPTION OF THE PREFERRED EMBODIMENTS

Figure 1:
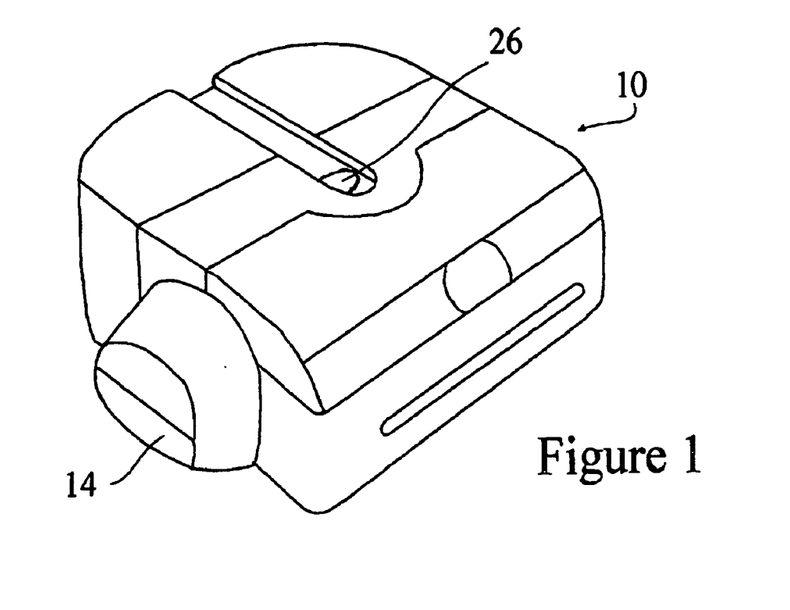
FIG. 1 is a perspective schematic view of a robotic cart pulling vehicle according to the present invention.
Figure 2:
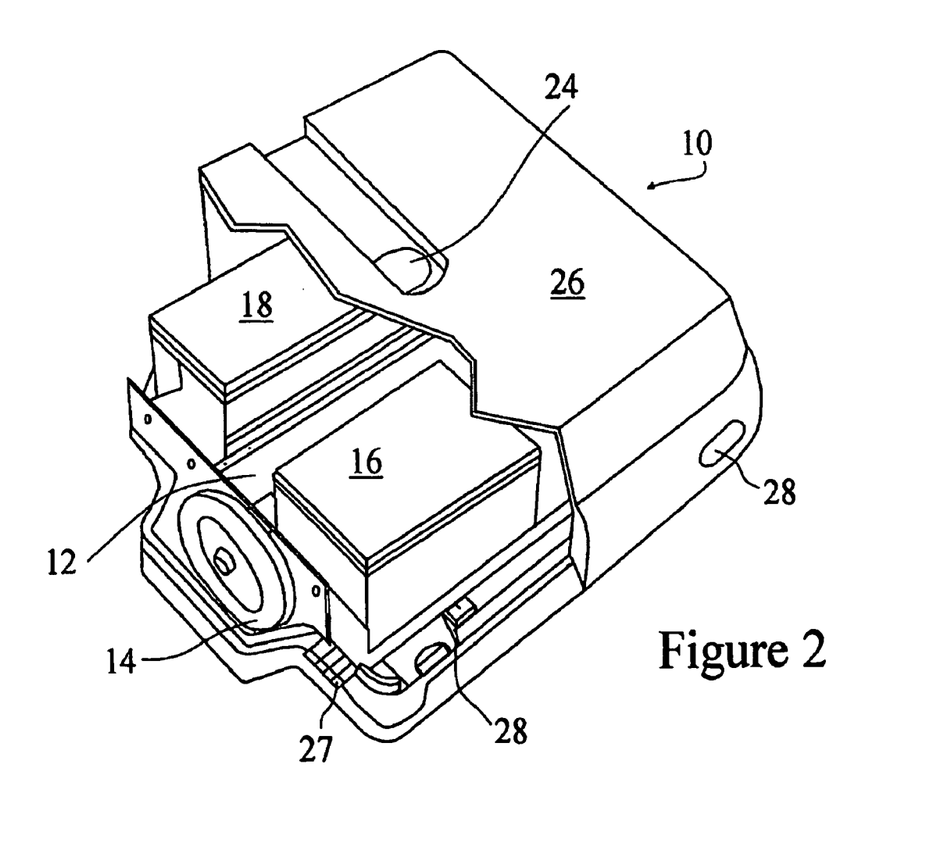
FIG. 2 is a perspective schematic view, partially broken away, of the robotic vehicle illustrated in FIG. 1.
Figure 3:
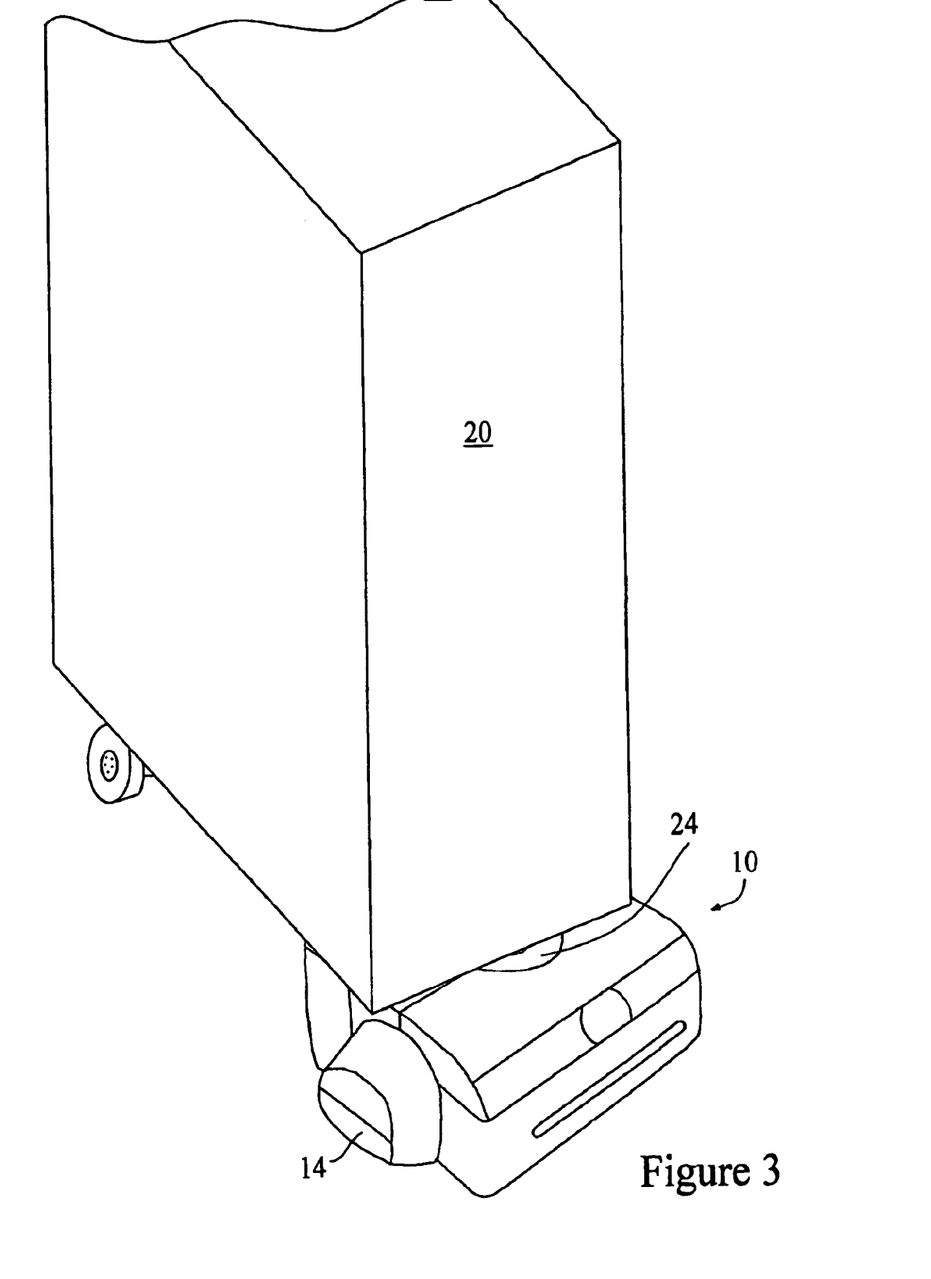
FIG. 3 is a perspective schematic view of the robotic vehicle of FIG. 1 attached to and pulling a cart.
Figure 4:
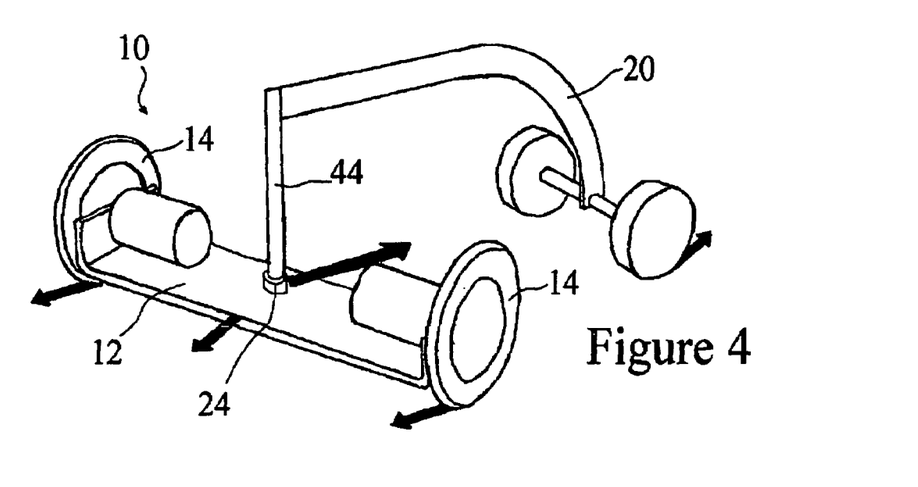
FIG. 4 is a schematic perspective view of the robotic vehicle and cart of FIG. 3 illustrating the forces on the vehicle and cart.

The robotic vehicle 10 or robot of the present invention is shown in FIGS. 1 and 2. The robotic vehicle 10 is essentially a chassis or body 12 with two co-axial driven wheels 14. The body 12 houses the circuit board or computer controller 16 for the vehicle 10. A battery pack 18 is also on the body 12 although the robotic vehicle 10 could also be powered through a battery on an attached cart or cart 20 being pulled by the robotic vehicle 10. A cart attachment mechanism 24 is centered on the body 12 midway between the wheels 14 essentially along and above the axels of the wheels 14. A housing 26 covers the body 12 and includes a collection of sensors 27 and 28 which are used for obstacle detection and correction of positioning and orientation error. Specifically, range sensors 27 are used for correction of positioning and orientation error as described below and sonar sensors 28 are used for obstacle detection as generally known in the art. The robotic vehicle 10 can have a variety of further features well known in the industry, such as audible outputs to announce its proximity. The present application is only focused on the unique aspects of the present robotic vehicle 10 not readily known to those in the art. Specifically the present application is focused on a robotic cart pulling vehicle 10 including a positioning error reducing system for reducing accumulated error in the ded-reckoning navigational system. The positioning error reducing system includes at least one of a low load transfer point of the cart attaching mechanism 24, a floor variation compliance structure whereby the drive wheels 14 maintain a substantially even distribution of load over minor surface variations, a minimal wheel contact surface structure, a calibration structure using at least one proximity sensor mounted on the robot body 12, and an electrical and mechanical connection between the cart and the robotic vehicle formed with a cart attaching post positioned at a midpoint of the wheel base.

A first aspect of the positioning error reducing system of the present invention relates to the use of the range sensors 27 and associated checkpoints in a calibration system to correct and eliminate ded-reckoning error. The most critical task for any mobile robotic vehicle is to know where it is with respect to some map (i.e. it's world map). Without this information the robotic vehicle can't calculate how to get anywhere. The robotic vehicle would not even know which way it's facing so it can't even start trying to travel to its destination. Obviously, if the robotic vehicle can't get where the operator wants it to go it can't perform much useful work. This is the main thrust of mobile robotics and it has been called the "navigation riddle."

The ultimate goal in addressing this issue may be some external system that keeps track of where the robotic vehicle is and which way it's facing and keeps the robotic vehicle informed. GPS is close to this goal, but it doesn't tell the robotic vehicle which way it's facing, it only works outside, and it isn't accurate enough to guide a robotic vehicle through a doorway. In lieu of this ideal system, some robots instead guess where they are from the amount they've turned each wheel. It's called ded-reckoning. This method is inherently flawed; therefore many robotic vehicles using deduced reckoning then correct any error that accumulates with any of a wide variety of sensor methods.

Most research effort is focused on the sensors for correcting the ded-reckoning error. One advance in the field with the present invention is to instead focus on the cause of the errors and the minimization and/or elimination of them. The present methods employed in the instant invention reduce ded-reckoning error from a typical 7% found in prior art robotic robots using deduced reckoning to less than 1% in the present invention.

Lateral accuracy in the known robotic vehicle position is hard to achieve because it depends on accurate knowledge of the heading of the robotic vehicle. If the robotic vehicle heading is just 6 degrees off (i.e. 6 degrees difference between the actual heading and the estimated heading assumed by the vehicle), traveling 10 feet forward will result in a lateral error of 1 foot. The robotic vehicle is 1 foot away from where it believes that it is, with the errors continuing to compound until corrected. The key to the effectiveness of any ded-reckoning system is maintaining the heading information as accurately as possible. Typical robot systems accumulate 10 to 16 degrees of heading error in executing a 180 degree rotation; the present robotic vehicle generates only 2.5 degrees of error executing a 180 degree rotation.

Figure 11:
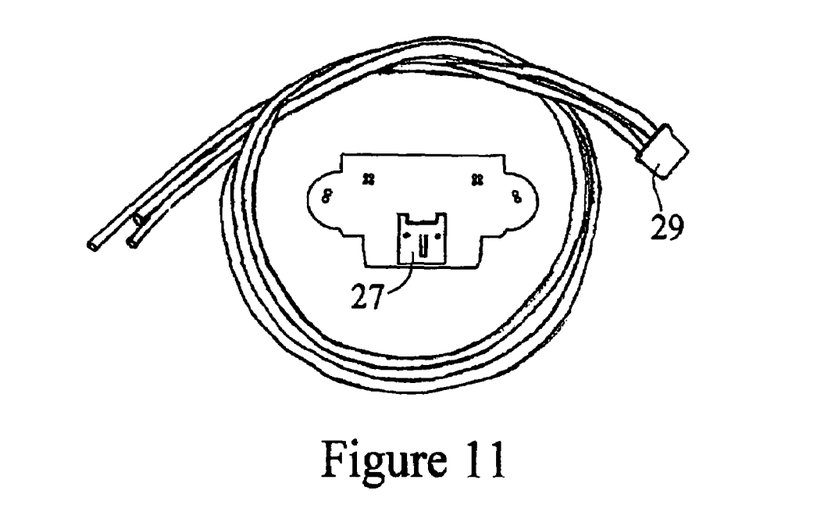
FIG. 11 is a plan view of a range sensor utilized in the correction of ded-reckoning error.

As discussed above, ded-reckoning systems accumulate error no matter how well they are designed and the present system still accumulates some small amount of error. The present invention incorporates a system for zeroing out accumulated error that utilize pre established checkpoints and may be referred to as light whisker™ checkpoints. A map of the world is held internally by the robotic vehicle 10 as understood by those in the art. On this map, virtual light whisker™ checkpoints" (LWC) are positioned along walls that have straight sections longer than a predetermined minimum amount, such as 2 feet. As many LWC's as can fit are placed along any wall that meets the minimum (e.g. 2') straight section requirement. When the robotic vehicle 10 is traveling parallel to a wall with a LWC, a conventional range sensor 27, such as a Sharp GP2D12 infrared sensor, is used to look sideways at the wall and measure a series of distances to the wall. FIG. 11 illustrates the Sharp GP2D12 sensor 27 which is described as providing less influence on the color of reflected objects, reflectivity. With the sensor 27, an external control circuit is unnecessary and the sensor 27 is very low cost. The GP2D12O infrared sensor 27 has special lenses and takes a continuous distance reading and reports the distance as an analog voltage with a distance range of 4 cm to 30 cm. The interface is 3-wire with power, ground and the output voltage and requires a JST 3-pin connector 29 that is shown in FIG. 11.

The measurements from the sensor 27 are provided to the controller 16 times a second as the robotic vehicle 10 travels. The sensor 27 reports the distance as an analog signal accurate to 1/5" and this is utilized, combined with the known geometry of the sensor 27 on the robotic vehicle 10 to determine a sequence of positions relative to the robot based coordinate system where this wall should be. Using this set of positions, a statistical method (to eliminate anomalous readings) may be used to determine if the data meets the criterion for a wall (e.g. "this section should be straight"). Then the following is determined: 1) the distance over to the wall and 2) the orientation of the wall. This orientation is compared to the expected orientation of the wall knowing where the robotic vehicle 10 believes it is with respect to its internal map. If the calculated position of the wall appears to be radically different from the previous expected position it is assumed a measurement error occurred and the data can be rejected. The value of what is "radically different" can be selected as known in the art. If the correction is within reason, it is assumed that the sensor data is right and the robotic vehicle's ded-reckoning based assumption about the position is not, and the new orientation is used to update the assumption about the vehicle position and orientation within the map (i.e. the robot's assumed orientation is calibrated). An additional feature maybe added where the vehicle 10 also "looks" at the ending or start of the wall to determine the other offset, (e.g. the forward/backward position). Again, the robotic vehicle 10 will do this as often as possible, sometimes every ten feet. This method may be modified to be used on non-linear continuous surfaces as well. For example, the checkpoints may be positioned on a wall having a known radius of curvature. Additionally, it is important to note that the checkpoints represent positions on a given wall, but no physical modification of the existing wall is required for utilizing the present invention. In this respect the checkpoints may be considered to be virtual checkpoints.

A key feature is the fact that the robotic vehicle 10 is mainly measuring orientation error and the fact that there are discrete measuring places or "checkpoints" that are "set up" then used comparatively. The use of a range sensor 27 is very effective for picking up orientation error with relatively little a sensor investment.

The use of an electrical connection through the mechanical connection of the cart attaching mechanism 24 between cart 20 and robot or robotic vehicle 10 is another key feature of the positioning error reducing system for reducing accumulated error in the ded-reckoning navigational system according to the present invention. This connection allows for the passage of both information and power between the cart 20 and the robot 10 as well as the transferring of the mechanical forces for towing of the cart 20.

The robot 10 needs both a mechanical connection to the cart 20 that it is pulling and an electrical connection if the cart 20 is to include any input or output devices associated with the robot 10. These can include directional controls (e.g. a joystick controller for movement) for controlling movement of the robot 10, sensors for assisting in detecting obstacles or position, emergency override (e.g. a stop button), a standard computer of touch screen interface, audible or visual indicators (e.g. light and sound systems), supplemental battery power for the robot 10, or the like. The electrical connection has two purposes, one to pass information back and forth between processors in each device, and the other to pass power in the case where the battery for driving the robot motors 30 is located in the cart 20 not the robot 10. For this purpose the present invention provides a novel connector that takes advantage of the mechanical loads to create excellent electrical current carrying capacity all through the same device.

Figure 8A:
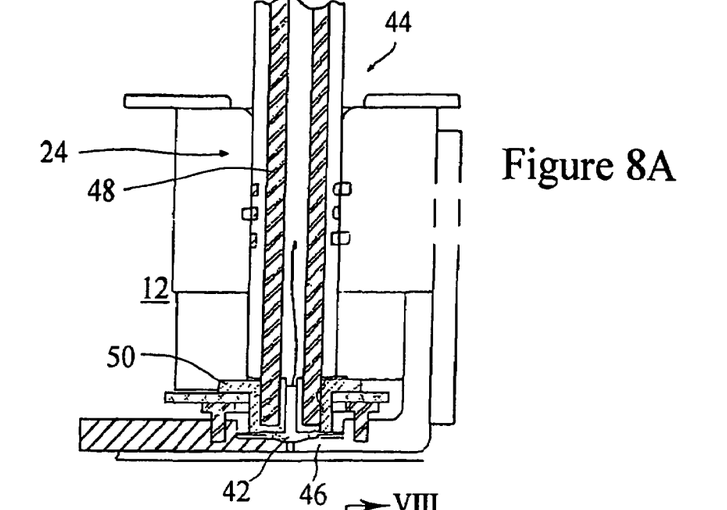
FIG. 8a is a schematic sectional side view of an electromechanical connection between the robotic vehicle and cart of the present invention and FIG. 8b is a schematic sectional side view of a modified electromechanical connection.
Figure 8B:
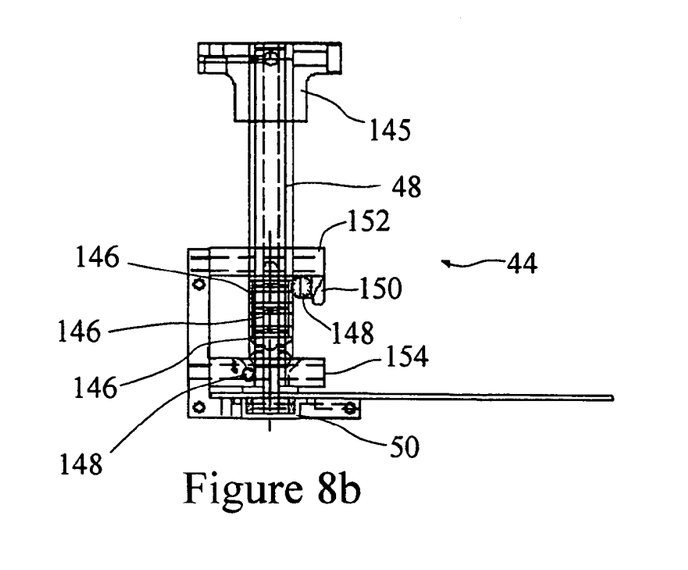
Figure 9A:
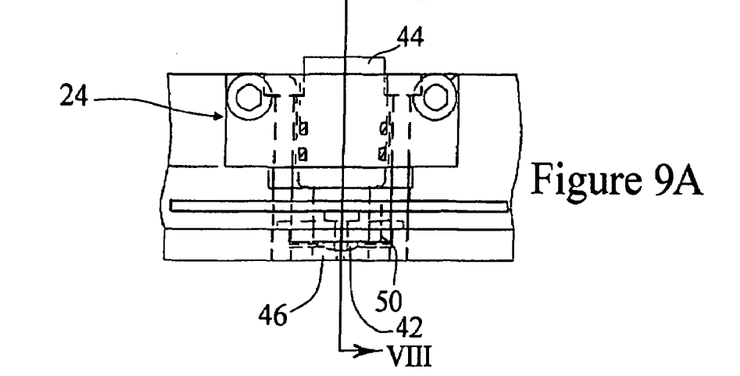
FIG. 9a is a front side view of the cart attaching connection illustrated in FIG. 8a and FIG. 9b is a front view of a modified connection of FIG. 8b.
Figure 9B:
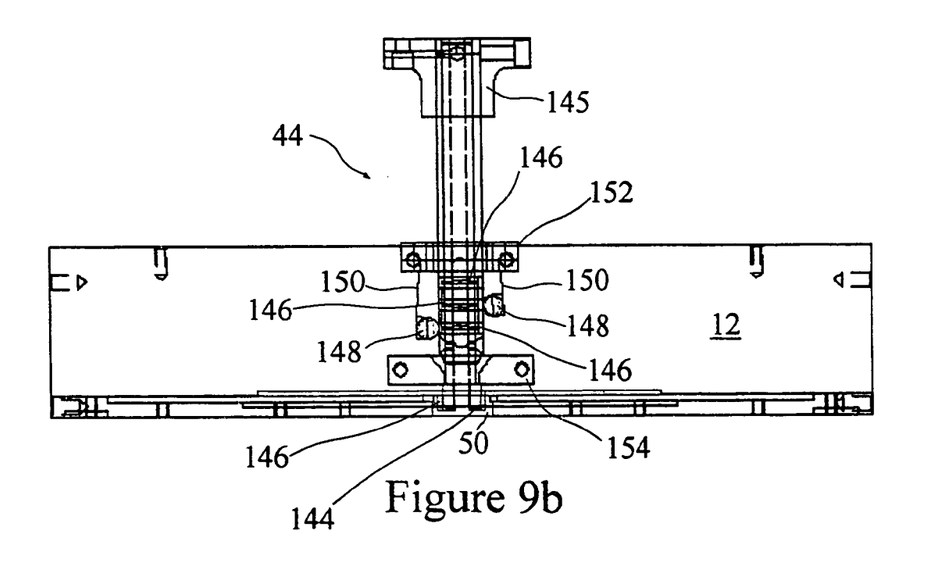
Figure 10:
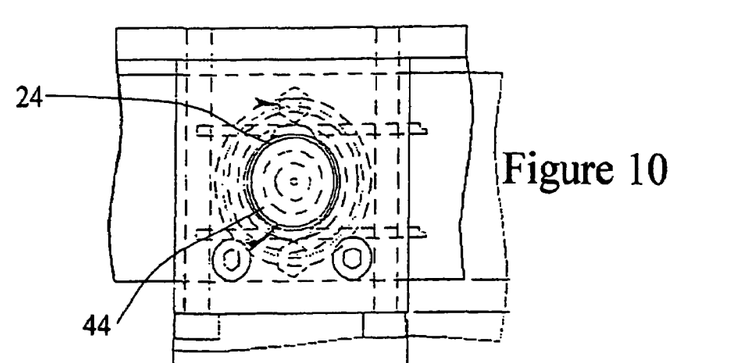

Essentially, there are two loads exerted on the robot 10 by the cart 20, one is downward where the robot 10 is holding up at least half of the cart 20, and the other is lateral, the one that actually pulls the cart 20 along. The downward load on the robot 10 is supported by one electrical connection and the lateral is supported by the return electrical connection. In this way, the invention can pass up to 20 amps of current through the connection while maintaining strong enough surface contact to avoid any arcing that would eventually wear the materials out. This method has the benefit of not only maintaining great contact but it also keeps the two electrical poles mechanically isolated from each other because they are in different planes. Standard ring approaches always have potential shorting problems during insertion and removal of the post into the connector while this method eliminates this problem. The details of this arrangement are found in FIGS. 8*a*, 9*a* and 10. One electrical connection between the cart 20 and the robot 10 is made between a bolt 42 at the end of wagon or cart attaching post 44 and the receiving metal support 46 on the robot 10 in a bore within the robot body and housing. The weight of the cart 20 that is carried by the robot 10 maintains this connection. This weight should be at least half of the weight of the cart 20, since increased weight on the robot 10 reduces accumulating positioning error due to a reduction in wheel slippage. The second electrical connection is between the steel tube 48 of the post and a brass bushing 50 in the robot 10. The tight fit between the tube 48 and the bushing 50 and the forces exerted through pulling of the cart 20 maintain this electrical connection. FIGS. 8*b* and 9*b* illustrate an alternative construction of the post 44 which still provides for both a mechanical and an electrical connection between the robotic vehicle 10 and the cart 20. This embodiment will avoid problems than can be encountered with a mechanical connection between the bolt 42 and the metal support 46 due to high loading. Specifically the post 44 includes a thrust bearing 142 at the end of the tube 48 in the bushing 50 which serves as the load transfer point between the cart 20 and the robot vehicle 10. A bearing sleeve 144 is in the bushing 50 between the tube 48 and the bushing 50 to allow free rotation of between the robot vehicle 10 and the cart 20 (and the cart attaching post 44 which is secured thereto through the post connector flange 145). Three copper rings 146 are surrounding the tube 48, insulated from each other and the tube 48. A brush contact 148 is biased into contact with a selected copper ring 144 by a steel spring support 150 attached to the body 12 through an upper or lower post support member 152 and 154 respectively. The upper and lower post support 152 and 154 may be considered to define a bore in the body 12 for the post 44. Another brush contact 148 may be biased against the tube 48 to provide a ground contact. The copper rings 148 and the brush contacts which engage them form a slip ring type electrical connection for electrically coupling the robotic vehicle 20 with the cart 20 (wires from the brush contacts to the controller 16 and from the cart 20 through the tube 48 to the rings 146 are not shown). Additional copper ring 148 and brush contacts 148 may be added if additional electrical connections are desired. The use of the central post 44 will avoid the positioning errors that can be introduced with a separate electrical and mechanical connection. For example a separate electrical cord between the cart 20 and the robot 10 may wrap around a mechanical connection as the robot turns relative to the cart 20 eventually restricting further rotational movement there between and creating large positional errors.

Figure 7:
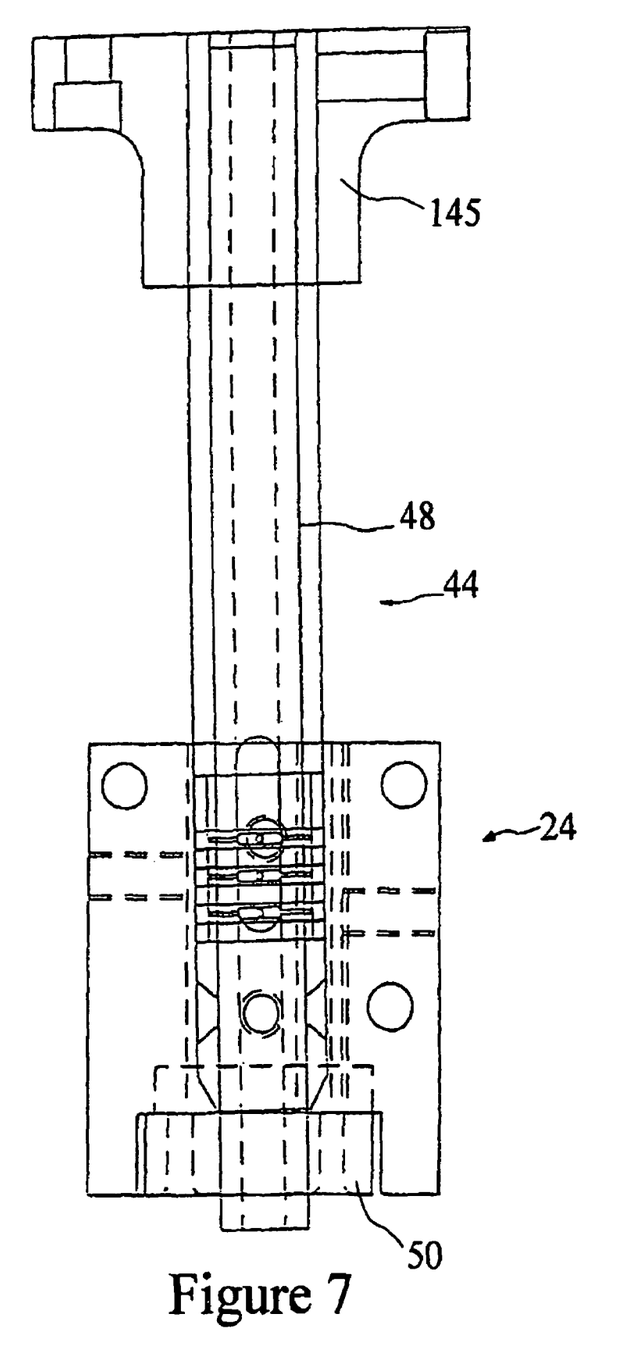
FIG. 7 is a sectional view illustrating a floor variation compliance structure of the robotic vehicle of FIG. 1.

Another key feature of the positioning error reducing system for reducing accumulated error in the ded-reckoning navigational system according to the present invention is the use of the mechanical/electrical connection between cart 20 and robot 10 that is rigid front to back but allows a certain amount side to side rotation, such as three degrees, forming a floor variation compliance structure. In this regard the connection 24 above the bushing 50 will be an ellipse or elongated along the vehicle wheel axis such as in the upper post support 152. The ellipse or elongation is along the wheel axles. This compliance is shown in FIG. 7 through the tilting of the post 44 relative to the robot 10, whereby each drive wheel 14 is mounted to said robot body 12 in a manner allowing vertical movement of said wheel 14 relative to the cart attaching post 44 in the amount of at least three degrees measured from a center point of the collinear drive wheel axles. In this manner the collinear drive wheels 14 maintain a substantially even distribution of load over minor surface variations.

There is always some amount of slippage occurring between the wheels 14 and the floor. The present robot 10 is of the two wheeled counter-rotating type and any heading change is calculated by knowing how much more one wheel 14 has turned than another. Slippage is difficult to measure. If the robot 10 could measure it, then it could calculate the impact on the heading by knowing how much more one wheel 14 has slipped than the other, which is described in some of the prior art patents.

The present strategy is to instead try to keep the slippage minimal and equal between the wheels 14 by using the following methods:

a) to minimize the slippage on smooth surface floors the robot 10 uses urethane coating 54 (such as on in line skate wheels) on the wheels 14 which has an incredibly large coefficient of friction while also being extremely durable;

b) the wagon or cart 20 is attached to the robot 10 in the center between the wheels 14 through a near frictionless bearing (i.e. the post 44 can rotate in the attaching mechanism 24) which keeps the lateral forces equal between the wheels 14;

c) the wagon or cart 20 is attached to the robot 10 (i.e. the cart loading forces are transferred) as low as possible to maintain the cart load as low as possible on the robot 10 (the forces being transferred through the bushing 50) which has the effect of keeping the downward forces as even as possible because the wagon or cart 20 isn't attempting to tip the robot 10 over as it is pulled around corners (this is believed to be the source of the greatest orientation error accumulation);

d) the robot 10 is designed to put as much of the weight of its cargo (the wagon or cart 20) over the robot 10 as possible;

e) finally the robot 10 is designed to reduce the rolling resistance and keeping the accelerations low.

As discussed above, the swivel or cart attaching mechanism 24 for the robot 10 has compliance of plus and minus three degrees about a vector pointing in the forward travel direction of the robot 10. In other words the post 44 can pivot in a plane defined by the wheel 14 axles. This compliance allows the robot 10 to have one wheel 14 a half inch higher than the other wheel 14 while still distributing the loads nearly evenly between them. This compensates for unevenness of the floor, which in a perfectly stiff connection (i.e. no compliance) could shift all the load to a single wheel 10 like a car with three wheels on the curb and the fourth hanging off over the curb. This is especially critical in navigating over door jambs which can be a half inch high where the robot 10 could cross them at a diagonal essentially leaving one wheel 14 completely off the floor without this feature. This side to side swivel is a key feature of the present invention, and the lack of which causes other robots to not work. There are two reasons: 1) floors not being perfectly level (in fact, it has been observed that variations of 20" side to side often exist when traveling straight forward 15 feet); and 2) when turning, the centripetal force of the robot and cart places more load on the outside wheel than the inside wheel if this swivel is not present and this would cause significant error. The only way this is solved is putting the attachment low (i.e. the position of the load transferring bushing 50) and with swivel about a forward pointing axis. Otherwise, there are times when all the weight would be on one wheel 14 and the creep that occurs between the floor and the tread would be drastically uneven causing large errors.

Additionally, to keep the slip equal between the wheels 14 the invention essentially uses a strategy of keeping the forces equal between them. Slippage is proportional to lateral forces (forces in the plane of the floor Fl) and inversely proportional to the downward force (Fd) the good force which maintains the friction between the wheel. There is also a random slippage caused by things like dirt on the floor that we call F (random noise) and over which there is no control.

$$\text{Slippage} = K(Fl/Fd) \times (F(\text{random noise}))$$

To minimize the slippage the robot 10 is designed to increase Fd as much as possible by putting as much of the weight of its cargo over the robot 10 as practical. The robot 10 design also tries to minimize Fl by reducing the rolling resistance and keeping the accelerations low. The trickier part is that the design of the robot 10 also tries to keep F1 and Fd as close to the same on each the left and right wheel 14 as possible so that on average (not constantly because there is still the random element which is inconsistent between the wheels 14) but on average, the slip that does occur is the same on both wheels 14 so that although there is some positional error generated, the heading error accumulation is minimal. The robot 10 design does this by not only attaching the cart 20 in the center between the wheels 14 through a near frictionless bearing 144 which keeps the lateral forces equal between the wheels 10 but the invention also attaches the cart load as low as possible on the robot 10 which has the effect of keeping the downward forces as even as possible because the cart 20 isn't attempting to tip the robot 10 over as it is pulled around corners, the source of the greatest orientation error accumulation. The load transfer point between the post and the robot 10 (i.e. the bushing 50) is below the wheel axle. More significantly the height of the load transfer point is less than 1/5 and preferably less than 1/10 of the wheel base.

Figure 5:
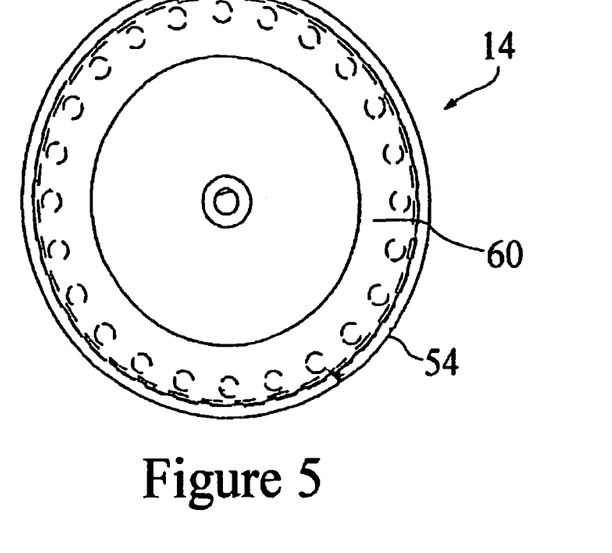
FIG. 5 is a plan view of a wheel of the robotic vehicle of the present invention.
Figure 6A:
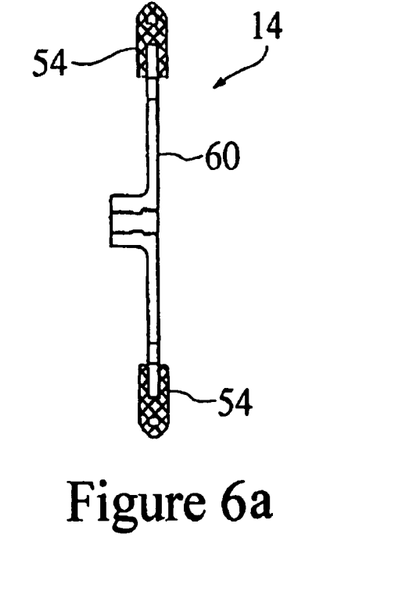
FIG. 6a is a schematic cross-sectional view of the wheel of FIG. 5
Figure 6B:
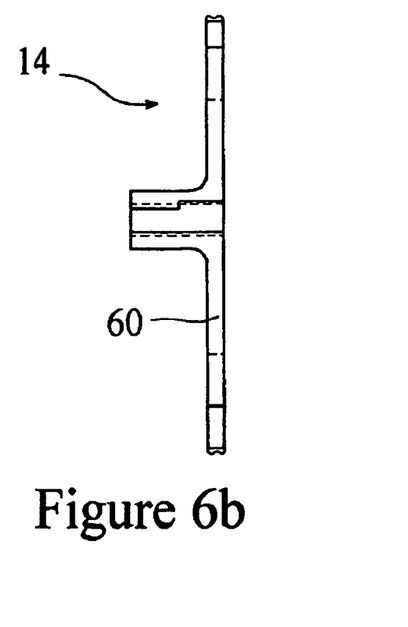
FIG. 6b is an enlarged cross sectional view of a modified wheel hub.

The robotic vehicle 10 of the present invention provides a number of unique designs for the wheels 14 as shown in FIGS. 5, 6a and 6b. Regarding the wheel design, the sticky urethane, or polyurethane, coating tread being provided as thin as possible over the hardened annular disk 60 will minimize the wheel radius variation. The radius variation of the wheel 14 is due to compression of the urethane coating.

In the present invention the thin coating of urethane is selected such that the compression of the wheels 14 under load (i.e. the change in radius of the wheel due to compression of the urethane coating) is less than 2% of the wheel radius, and preferably less than 1% of the wheel radius. The load referred to is more precisely the change in load between a robot and attached unloaded cart and the robot and attached loaded cart. The robot 10 and attached unloaded cart 20 are considered a base line, or unloaded, state for the wheels 14. This is in contrast to prior art dirigible wheels that compress, in operation, to a large fraction of the wheel radius, resulting in significant deduced reckoning error. Additionally, the annular wheel contact patch is provided as narrow as possible, on the order of 0.20 in, to keep the effective width between the wheels 14 as constant as possible. A large contact patch for the wheels will result in a variation of the effective wheel base. In the present invention the width of the contact patch of each wheel 14 is less than 1.5%, and preferably less than 1% of the wheel base between the wheels. The narrow wheels allow the variations in the effective wheel base to remain relatively small, specifically the change in the wheel base of the the robot 10 will be less than 2%, possibly even less than 0.5%. These wheel design features minimize deduced reckoning error as discussed above. Additionally, the system of the present invention is designed to provide the cargo weight mainly over the robot 10 to maximize traction and minimize wheel slippage, minimizing wheel error. Furthermore, the attachment of the cart load as low as possible will keep the downward force as even as possible so that the cart is not attempting to tip the robot over as being pulled around corners, as discussed above. All of these design considerations improve the deduced reckoning of the present invention.

The robotic vehicle 10 of the present invention provides an automatic, labor-saving indoor freight hauler that is capable of hauling up to 500 pounds of goods on a cart 20 and can fit into a suitcase. The robotic vehicle 10 is generally the size of a suit box, about 20 inches wide and 8 inches tall. The vehicle 10 can effectively be described as a circuit board on wheels 14 mounted on a metal chassis or body 12 with a set of batteries 18, a PC mother board and with attached sensors 27, 28. The described vehicle 10 can perform rounds stopping at a series of stations or can do fetch and deliver errands and can haul a variety of carts 20 to the appropriate job. It is anticipated that the robotic vehicle 10 will be controlled with a graphical user interface. Furthermore, the carts 10 can be modified to include the battery as discussed above, or other interface connections such as a steerable joystick and the like. Another key feature of the present invention is the ability to easily retrofit existing carts 20 to be utilized with the robot 10 of the present invention. The retrofitting of existing carts 20 would generally only require the addition of an appropriate post 44. Additional elements such as supplemental batteries, input devices such as steering joystick or a keyboard, or sensors may also be retrofitted onto the existing carts 20.

The above described embodiments is intended to be merely illustrative of the present invention and not restrictive thereof. A wide number of modifications are anticipated within the scope of the present invention as will be appreciated by those of ordinary skill in the art. The scope of the present invention is intended to be defined by the appended claims and equivalents thereof.

What is claimed is:

1. A robotic cart pulling vehicle comprising:
   at least two axially collinear drive wheels;
   a robot body mounted on said drive wheels;
   a control system on the robot body utilizing, at least in part, a ded-reckoning navigational system;
   a cart attaching mechanism on said robot body for coupling a cart to said robotic vehicle; and
   a positioning error reducing system for reducing accumulated error in the ded-reckoning navigational system, said positioning error reducing system including at least a calibration system having at least one proximity sensor mounted on the robot body, said control system coupled to said at least one proximity sensor for adjusting a calculated robotic position, wherein the control system sets up virtual checkpoints along known fixed features of a predetermined length, takes a statistically significant number of proximity readings along an adjacent fixed feature, removes statistically anomalous readings and automatically adjusts the calculated robotic position based upon statistically significant readings.

2. The robotic cart pulling vehicle of claim 1 wherein each said proximity sensor is an infrared range sensor.

3. The robotic cart pulling vehicle of claim 1 wherein at least one fixed feature is a straight wall section of at least 2' in length.

4. The robotic cart pulling vehicle of claim 1 wherein each said fixed feature is a straight wall section of at least the predetermined length.

5. The robotic cart pulling vehicle of claim 1 wherein said statistically significant number of proximity readings taken along an adjacent fixed feature are obtained by the control system at a rate of about 16 times a second as the robotic vehicle moves along the adjacent fixed feature.

6. The robotic cart pulling vehicle of claim 1 wherein the positioning error reducing system includes a load transfer point of the cart attaching mechanism, that is in a form of a load transfer ring positioned at a height from a supporting surface of the robotic cart pulling vehicle that is below a height that is selected from at least one of
   (a) approximately (1/5) of a length of the wheel base of said drive wheels, and
   (b) a height of the axles of the drive wheels.

7. The robotic cart pulling vehicle of claim 6 wherein the load transfer ring is positioned at a height below a height that is approximately (1/10) of the length of the wheel base.

8. The robotic cart pulling vehicle of claim 6 wherein the load transfer ring is positioned at a height below the axles of the drive wheels.

9. The robotic cart pulling vehicle of claim 6 wherein the positioning error reducing system includes a minimal wheel contact surface structure, wherein each said drive wheel includes an annular contact surface formed as a coating over a solid, stiff core and includes at least one of
   (a) compression of the wheel in operation which is less than 2% of the wheel radius of the wheel under no load, and
   (b) the width of the annular contact surface is less than 1.5% of the length of the wheelbase.

10. The robotic cart pulling vehicle of claim 9 wherein the positioning error reducing system includes a minimal wheel contact surface structure, wherein each said drive wheel includes an annular contact surface formed as a coating over a solid, stiff core and includes at least one of
   (a) compression of the wheel in operation which is less than 1% of the wheel radius of the wheel under no load, and
   (b) the width of the annular contact surface is less than 1.0% of the length of the wheelbase.

11. The robotic cart pulling vehicle of claim 9 wherein the positioning error reducing system includes a floor variation compliance structure, wherein the cart attaching mechanism includes a cart attaching bore in the robot body and a cart attaching post within the cart attaching bore, wherein each said drive wheel is mounted to said robot body in a manner allowing vertical movement of said wheel relative to the cart attaching post in the amount of at least three degrees measured from a center point between the collinear drive wheels along axles of the collinear drive wheels, whereby said collinear drive wheels maintain a substantially even distribution of load over minor surface variations.

12. The robotic cart pulling vehicle of claim 1 wherein the positioning error reducing system includes a minimal wheel contact surface structure, wherein each said drive wheel includes an annular contact surface formed as a coating over a solid, stiff core and includes at least one of
  (a) compression of the wheel in operation is less than 1% of the wheel radius of the wheel under no load, and
  (b) the width of the annular contact surface is less than 1.0% of the length of the wheelbase.

13. The robotic cart pulling vehicle of claim 1 wherein the positioning error reducing system includes a floor variation compliance structure, wherein the cart attaching mechanism includes a cart attaching bore in the robot body and a cart attaching post within the cart attaching bore, wherein each said drive wheel is mounted to said robot body in a manner allowing vertical movement of said wheel relative to the cart attaching post in the amount of at least three degrees measured from a center point between the collinear drive wheels along axles of the collinear drive wheels, whereby said collinear drive wheels maintain a substantially even distribution of load over minor surface variations.

14. A robotic cart pulling vehicle comprising:
  at least two axially collinear drive wheels;
  a robot body mounted on said drive wheels;
  a control system on the robot body utilizing, at least in part, a ded-reckoning navigational system;
  a cart attaching mechanism on said robot body for coupling a cart to said robotic vehicle; and
  a positioning error reducing system for reducing accumulated error in the ded-reckoning navigational system, said positioning error reducing system including at least a minimal wheel contact surface structure, wherein each said drive wheel includes an annular contact surface formed as a coating over a solid, stiff core and includes at least one of
  (a) compression of the wheel in operation is less than 2% of the wheel radius of the wheel under no load,
  (b) the width of the annular contact surface is less than 1.5% of the length of the wheelbase, and
  (c) the width of the annular contact surface is on the order of 0.20".

15. The robotic cart pulling vehicle of claim 14 wherein the positioning error reducing system includes a floor variation compliance structure, wherein the cart attaching mechanism includes a cart attaching bore in the robot body and a cart attaching post within the cart attaching bore, wherein each said drive wheel is mounted to said robot body in a manner allowing vertical movement of said wheel relative to the cart attaching post in the amount of at least three degrees measured from a center point between the collinear drive wheels along axles of the collinear drive wheels, whereby said collinear drive wheels maintain a substantially even distribution of load over minor surface variations.

16. The robotic cart pulling vehicle of claim 14 wherein the positioning error reducing system includes a minimal wheel contact surface structure, wherein each said drive wheel includes an annular contact surface formed as a coating over a solid, stiff core and includes at least one of
  (a) compression of the wheel in operation is less than 1% of the wheel radius of the wheel under no load, and
  (b) the width of the annular contact surface is less than 1.0% of the length of the wheelbase.

17. A robotic cart pulling vehicle comprising:
  at least two axially collinear drive wheels;
  a robot body mounted on said drive wheels;
  a control system on the robot body utilizing, at least in part, a ded-reckoning navigational system;
  a cart attaching mechanism on said robot body for coupling a cart to said robotic vehicle; and
  a positioning error reducing system for reducing accumulated error in the ded-reckoning navigational system, said positioning error reducing system including at least a minimal wheel contact surface structure, wherein each said drive wheel includes an annular contact surface formed as a coating over a solid, stiff core and includes at least one of
  (a) compression of the wheel in operation is less than 1% of the wheel radius of the wheel under no load, and
  (b) the width of the annular contact surface is less than 1.0% of the length of the wheelbase.

18. The robotic cart pulling vehicle of claim 17 wherein the cart attaching mechanism includes a cart attaching bore in the robot body and a cart attaching post within the cart attaching bore, wherein the cart attaching post provides both a mechanical and an electrical connection between the cart and the robot vehicle.

19. A robotic cart pulling vehicle comprising:
  at least two axially collinear drive wheels;
  a robot body mounted on said drive wheels;
  a control system on the robot body utilizing, at least in part, a ded-reckoning navigational system;
  a cart attaching mechanism on said robot body for coupling a cart to said robotic vehicle; and
  a positioning error reducing system for reducing accumulated error in the ded-reckoning navigational system, said positioning error reducing system including at least a floor variation compliance structure, wherein the cart attaching mechanism includes a cart attaching bore in the robot body and a cart attaching post within the cart attaching bore, wherein each said drive wheel is mounted to said robot body in a manner allowing vertical movement of said wheel relative to the cart attaching pole in the amount of at least three degrees measured from a center point between the collinear drive wheels along axles of the collinear drive wheels, whereby said collinear drive wheels maintain a substantially even distribution of load over minor surface variations.

* * * * *